US009875361B2

(12) United States Patent
Yoo et al.

(10) Patent No.: US 9,875,361 B2
(45) Date of Patent: Jan. 23, 2018

(54) METHOD AND SERVER FOR PROVIDING A SOCIAL NETWORK SERVICE

(71) Applicant: Foundation of Soongsil University-Industry Cooperation, Seoul (KR)

(72) Inventors: MyungSik Yoo, Seoul (KR); Wenji Quan, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 237 days.

(21) Appl. No.: 14/283,444

(22) Filed: May 21, 2014

(65) Prior Publication Data
US 2014/0351331 A1 Nov. 27, 2014

(30) Foreign Application Priority Data
May 21, 2013 (KR) .................. 10-2013-0057263

(51) Int. Cl.
G06F 21/62 (2013.01)
G06F 21/60 (2013.01)
G06Q 50/00 (2012.01)

(52) U.S. Cl.
CPC .............. G06F 21/60 (2013.01); G06F 21/62 (2013.01); G06Q 50/01 (2013.01)

(58) Field of Classification Search
CPC ................................. G06F 21/60; G06F 21/62
See application file for complete search history.

(56) References Cited

U.S. PATENT DOCUMENTS

| 2006/0042483 | A1* | 3/2006 | Work ..................... G06Q 10/00 101/91 |
| 2008/0109245 | A1* | 5/2008 | Gupta .................... G06Q 30/02 705/1.1 |
| 2009/0216859 | A1* | 8/2009 | Dolling .................. G06Q 30/02 709/218 |
| 2010/0010826 | A1* | 1/2010 | Rosenthal .............. G06Q 99/00 705/1.1 |

(Continued)

FOREIGN PATENT DOCUMENTS

EP 2256675 A1 * 12/2010 ....... G06F 17/30867

*Primary Examiner* — Nicholas Taylor
*Assistant Examiner* — Christopher B Robinson
(74) *Attorney, Agent, or Firm* — Mintz Levin Cohn Ferris Glovsky and Popeo, P.C.; Kongsik Kim; Jonathon Western

(57) ABSTRACT

A method for providing a social network service includes: (a) setting an access threshold value for a content belonging to a content owner and a weight value for one or more communities of which the content owner is a member; (b) extracting a community of which a content requester is a member from among the communities of which the content owner is a member, when a request for the content is received from the content requester, and calculating an activity value of the content requester for the extracted community; (c) calculating a reputation value for the content requester by using one or more of a number of the extracted communities, a weight value set for the extracted communities, and the calculated activity value; and (d) providing the content requester with authorization to access the content according to a comparison result between the reputation value and the access threshold value.

11 Claims, 6 Drawing Sheets

(56) References Cited

U.S. PATENT DOCUMENTS

2011/0022602 A1\* 1/2011 Luo ................. G06Q 10/10
707/748
2013/0097246 A1\* 4/2013 Zifroni ............ G06Q 50/01
709/204

\* cited by examiner

METHOD AND SERVER FOR PROVIDING A SOCIAL NETWORK SERVICE

CROSS-REFERENCE TO RELATED APPLICATIONS

This application claims the benefit of Korean Patent Application No. 10-2013-0057263, filed with the Korean Intellectual Property Office on May 21, 2013, the disclosure of which is incorporated herein by reference in its entirety.

BACKGROUND

1. Technical Field

The present invention relates to a method and server for providing a social network service, more particularly to a method and server for providing a social network service by using the users' reputations in a social network.

2. Description of the Related Art

A social network service (hereinafter referred to as "SNS") is a web-based service that allows users to form new relationships or strengthen existing relationships.

Various relationships and communities may be formed between the users of a SNS, and various contents belonging to each user can be shared between members of the same community.

In a conventional service, the sharing of contents within a community may involve a community administrator determining membership ratings in consideration of the frequency of access to the community, number of posts written, etc., and allowing the sharing of contents between community members only for those who have a particular membership rating or higher.

However, this method does not consider the degree of closeness between a content owner and a content requester, so that when a content owner wishes to restrict the sharing of a particular content to community members that are close with the content owner, the content has to be shared by other means such as e-mail or messenger.

SUMMARY

To resolve the problem described above, an aspect of the invention aims to provide a way to share contents based not on the conditions defined by the administrator of a social network, but on the degree of closeness within the social network.

To achieve the objective above, an aspect of the invention provides a method for providing a social network service that includes: (a) setting an access threshold value for a particular content belonging to a content owner and a weight value for one or more communities of which the content owner is a member; (b) extracting a community of which a content requester is a member from among the one or more communities of which the content owner is a member, when a request for the particular content is received from the content requester, and calculating an activity value of the content requester for the extracted community; (c) calculating a reputation value for the content requester by using one or more of a number of the extracted communities, a weight value set for the extracted communities, and the calculated activity value; and (d) providing the content requester with authorization to access the particular content according to a comparison result between the calculated reputation value and the set access threshold value.

An embodiment of the invention may further include, before step (a): receiving selection information for the particular content, setting information for the access threshold value, and setting information for the weight value from a terminal of the content owner.

Also, in an embodiment of the invention, said step (b) may include: receiving the request from a terminal of the content requester, with the request including information on one or more communities of which the content requester is a member and information on an acquaintance of the content requester; and calculating the activity value based on one or more of a number of visits by the content requester to the extracted community, a number of replies to posts written by the content owner, and a number of one-to-one contacts with the content owner.

Also, in an embodiment of the invention, step (c) may include calculating the reputation value based further on a number of acquaintances of the content requester that are also acquaintances of the content owner.

Also, in an embodiment of the invention, step (d) may include transmitting the particular content to a terminal of the content requester if the calculated reputation value is greater than the set access threshold value.

To achieve the objective above, an aspect of the invention provides an apparatus for providing a social network service that includes: a setting unit configured to set an access threshold value for a particular content belonging to a content owner and a weight value for one or more communities of which the content owner is a member; an activity calculator unit configured to extract a community of which a content requester is a member from among the one or more communities of which the content owner is a member, when a request for the particular content is received from the content requester, and calculate an activity value of the content requester for the extracted community; a reputation calculator unit configured to calculate a reputation value for the content requester by using one or more of a number of the extracted communities, a weight value set for the extracted communities, and the calculated activity value; and an access authorization unit configured to provide the content requester with authorization to access the particular content according to a comparison result between the calculated reputation value and the set access threshold value.

In an embodiment of the invention, the apparatus for providing a social network service may further include: an interface provider unit configured to provide an interface for setting the access threshold value and the weight value to a terminal of the content owner, where the setting unit searches for the one or more communities of which the content owner is a member.

Also, in an embodiment of the invention, the activity calculator unit may calculate the activity value based on one or more of a number of visits by the content requester to the extracted community, a number of replies to posts written by the content owner, and a number of one-to-one contacts with the content owner.

Also, in an embodiment of the invention, the reputation calculator unit may calculate the reputation value based further on a number of acquaintances of the content requester that are also acquaintances of the content owner.

Also, in an embodiment of the invention, the apparatus for providing a social network service may further include a content transmission unit configured to transmit the particular content to a terminal of the content requester if the calculated reputation value is greater than the set threshold value.

To achieve the objective above, an aspect of the invention provides a method for providing a social network service that includes: (a) receiving as input a selection for a particular content to be shared within a community; (b) displaying an interface for inputting an access threshold value for the particular content and a weight value for a community of which a content owner is a member; (c) receiving the access threshold value and the weight value as input via the interface; and (d) transmitting the inputted access threshold value and the weight value to a service provider server, where the access threshold value is an indicator of a sharing level of the content owner for the particular content, and the weight value is an indicator representing a degree of importance of the community to the content owner.

In another embodiment of the invention, step (b) may include further displaying an interface for inputting information on an acquaintance of the content owner, step (c) may include further receiving information on an acquaintance of the content owner as input via the interface, and step (d) may include transmitting the information on an acquaintance of the content owner together with the access threshold value and the weight value to the service provider server.

According to an embodiment of the invention, contents can be shared based not on the conditions defined by an administrator of a social network, but on the degree of closeness within the social network.

Also, an embodiment of the invention can enhance the protection of privacy within a social network as well as allow a stable sharing of contents within the social network.

Additional aspects and advantages of the present invention will be set forth in part in the description which follows, and in part will be obvious from the description, or may be learned by practice of the invention.

DETAILED DESCRIPTION

Figure 1:
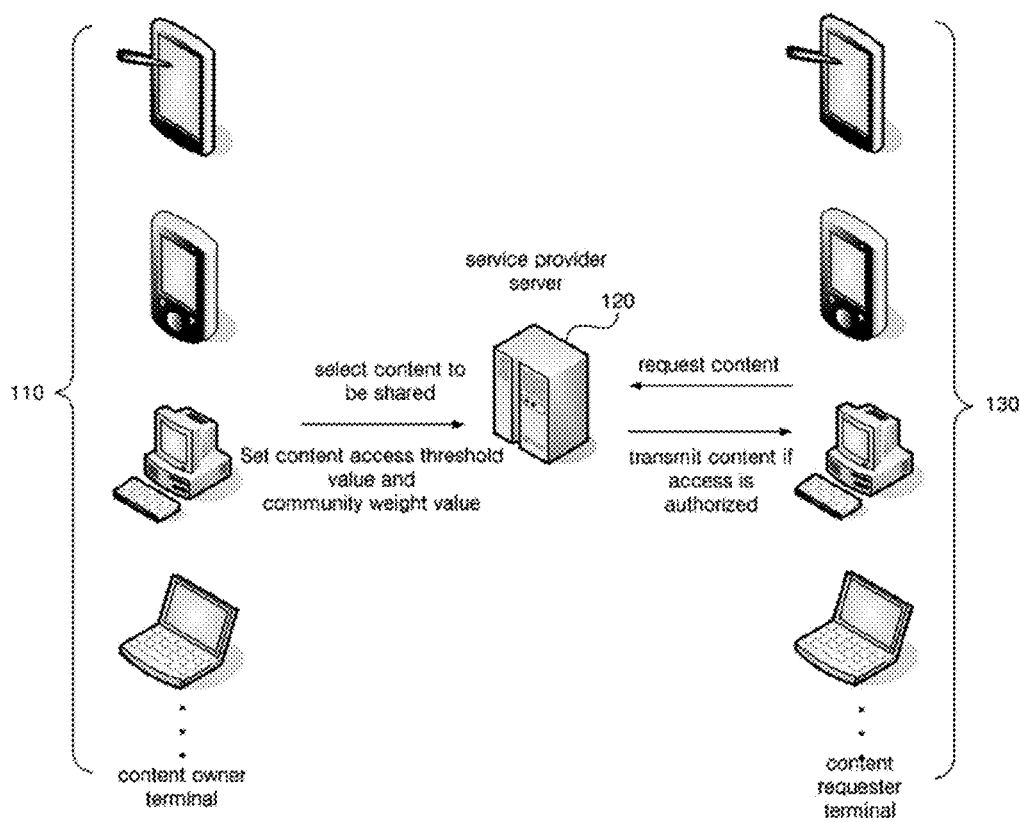
FIG. 1 illustrates the composition of a system for providing a social network service according to an embodiment of the invention.

The present invention will be described below with reference to the accompanying drawings. However, the present invention can be implemented in several different forms and is not limited to the embodiments described herein.

In order to describe embodiments of the present invention with greater clarity, certain parts have been omitted in the drawings, and like reference numerals have been used for like parts throughout the specification.

In the specification, the description that a part is "connected" to another part refers not only to those cases in which the parts are "connected directly" but also to those cases in which the parts are "connected indirectly" by way of one or more other members interposed inbetween.

Also, the description that a part "includes" a component means that additional components may further be included and does not preclude the existence of other components unless specifically indicated.

Certain embodiments of the invention will now be described in more detail with reference to the accompanying drawings.

FIG. 1 illustrates the composition of a system for providing a social network service according to an embodiment of the invention.

A system 100 for providing a social network service according to an embodiment of the invention can include content owner terminals 110, a service provider server 120, and content requester terminals 130.

Here, the content owners and the content requesters may be members of a social network (hereinafter referred to as a "community") provided by the service provider server 120.

Looking at the components in more detail, the content owner terminal 110 can include portable communication terminals such as smart phones, PDA's, PMP's, tablet PC's, laptop PC's, etc., as well as communication terminals such as desktop PC's, IPTV's connected to set-top boxes, etc., and can connect to the service provider server 120 (connect to a community provided by the service provider server 120) so that contents which the content owner wish to share may be transmitted to the service provider server 120.

Afterwards, a content owner terminal 110 can receive from the service provider server 120 an interface with which to set an access threshold value for a content chosen for sharing (hereinafter referred to simply as "access threshold value") and a weight value for one or more communities of which the content owner is a member (hereinafter referred to simply as "community weight value"), and display the interface on a screen.

Here, the "access threshold value" may be an indicator representing the sharing level of a content set by the content owner. The access threshold value can be shown on the interface as "high/medium/low" or "1~5" to indicate the permitted level of sharing.

A high sharing level for a content chosen for sharing can mean that the content is extremely personal or requires high security.

For example, when sharing a content that requires high security within a community, the content owner can set the access threshold value for the content to "high" or "5" (assuming that a higher number represents a higher sharing level and that the highest number is 5).

The "community weight value" may be an indicator representing the importance of a community to the content owner. A community weight value can be shown on the interface as "high/medium/low" or "1~5" to indicate the degree of importance.

For example, suppose that among the communities A, B, C, and D, of which a content owner is a member, community A is visited by the content owner every day, with the content owner actively uploading posts and finding much knowledge and help from community A; community B is visited by the content owner periodically, with the content owner mainly reading posts and searching materials from community B; while communities C and D include the content owner as a member but the content owner remains largely inactive in communities C and D. Then, the content owner can set the weight value for community A as "high" or "5" (assuming that a higher number represents a higher sharing level and that the highest number is 5), set the weight value for community B as "medium" or "3", and set the weight value for communities C and D as "low" or "1".

If the content owner is a member of more than one community, the interface can display multiple communities, and the content owner can select the weight value of each community according to the frequency of involvement in or the level of trust of the community.

The content owner terminal 110 can also transmit information on acquaintances to the service provider server 120.

Here, an "acquaintance" can be a member of a community provided by the service provider server 120 or a member of a community for sharing contents, while the "information on acquaintances" can include one or more of an ID, e-mail address, name, and birth date of one or more acquaintances.

When a content sharing request, including information on a particular content that a content owner wishes to share, is received from a content owner terminal 110, the service provider server 120 can transmit an interface for setting the access threshold value of the content and the community weight values to the content owner terminal 110. The setting of the community weight values can be performed prior to the content sharing request.

To perform the above, the service provider server 120 can search for communities which the content owner joined as a member, and can transmit information on the communities found by the search, together with the interface, to the content owner terminal 110.

Afterwards, the service provider server 120 can receive selection information regarding the access threshold value and community weight values selected via the interface from the content owner terminal 110, and can set the access threshold value and community weight values based on the values corresponding to the selections.

Also, the service provider server 120 can receive information on acquaintances from the content owner terminal 110.

Also, the service provider server 120 can receive a request for a particular content shared within a particular community from a content requester terminal 130, and can search for information on the communities of which the content requester is a member and for information on the acquaintances of the content requester.

Here, the information on the acquaintances of the content requester can include information on acquaintances inputted by the content requester when joining the SNS provided by the service provider server 120.

Also, the service provider server 120 can extract communities (hereinafter referred to as "common communities") of which the content requester is also a member from among the communities of which the content owner is a member, and can calculate the activity values of the content requester for the extracted common communities.

If there are more than one common communities extracted, then the service provider server 120 can calculate the activity value of the content requester for each of the common communities.

Here, the "activity value" can be calculated for a common community based on the number of visits by the content requester to the community, the number of replies made by the content requester in relation to posts made by the content owner in the community, and the number of one-to-one contacts (e.g. private messages) between the content requester and the content owner within the community.

In cases where the service provider server 120 interworks with the server (not shown) of a mobile communication company, the service provider server 120 can further include one or more of the number of text messages and the number of voice calls between the content requester and the content owner in the number of one-to-one contacts.

The descriptions that follow employ examples in which the one-to-one contacts between the content requester and the content owner include one or more of private messages, text messages, and voice calls.

A more detailed description of the activity value will be provided later on with reference to FIG. 2.

Also, the service provider server 120 can calculate a reputation value for the content requester based on one or more of the number of common communities, the weight values set for the common communities, and the activity values for the common communities, and can also calculate the reputation value by further considering the number of common acquaintances from among the acquaintances of the content owner and the acquaintances of the content requester.

A more detailed description of the reputation value will be provided later on with reference to FIG. 2.

The service provider server 120 may compare the reputation value with the access threshold value set for the content requested by the content requester, and can provide the content requester with authorization to access the requested content according to the result.

For example, the service provider server 120 can provide the content requester with authorization to access the particular content if the reputation value of the content requester is greater than the access threshold value of the particular content which the content requester requested, and can transmit the particular content to the content requester terminal 130.

The content requester terminal 130 can include portable communication terminals such as smart phones, PDA's, PMP's, tablet PC's, laptop PC's, etc., as well as communication terminals such as desktop PC's, IPTV's connected to set-top boxes, etc., and can connect to the service provider server 120 (connect to a community provided by the service provider server 120) to transmit a request for a particular content.

Here, the transmitted request for a particular content can include information on the communities of which the content requester is a member and information on the content requester's acquaintances.

After sending the request for a particular content, the content requester terminal 130 can receive the particular content from the service provider server 120 according to the content requester's reputation value with respect to the content owner.

Figure 2:
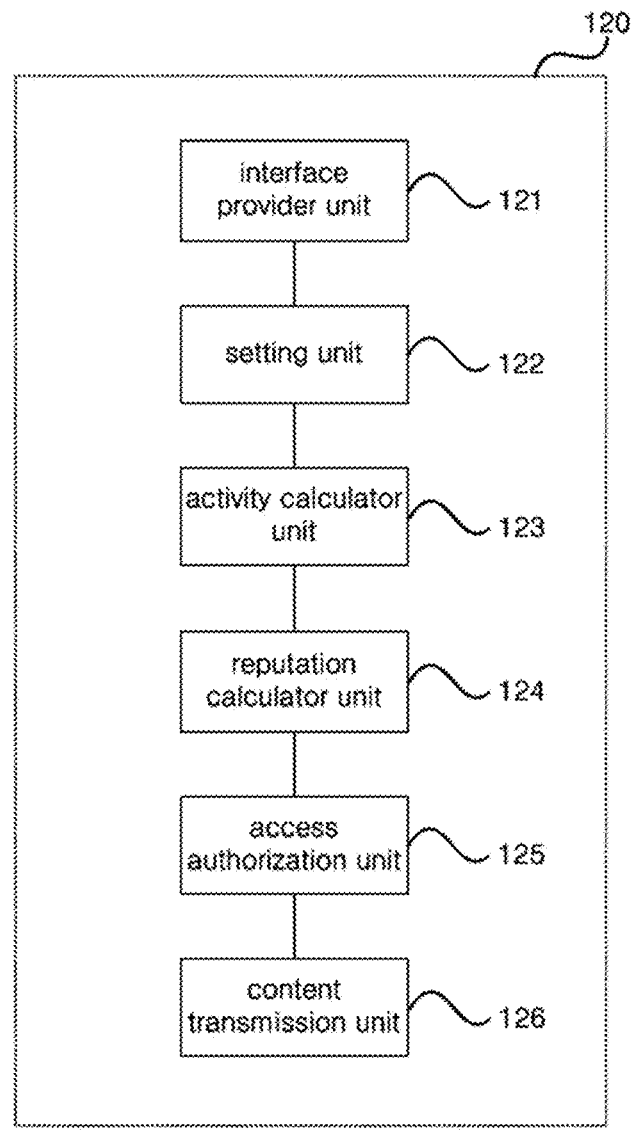
FIG. 2 is a block diagram illustrating the composition of a server for providing a social network service according to an embodiment of the invention.

FIG. 2 is a block diagram illustrating the composition of a server for providing a social network service according to an embodiment of the invention.

A service provider server 120 according to an embodiment of the invention can include an interface provider unit 121, a setting unit 122, an activity calculator unit 123, a reputation calculator unit 124, an access authorization unit 125, and a content transmission unit 126.

Looking at the components in more detail, when a request for a content sharing is received from a content owner terminal 110 for a particular content which the content owner wishes to share, the interface provider unit 121 can transmit an interface for setting the access threshold value of the content and the community weight values to the content owner terminal 110.

For this purpose, the interface provider unit 121 can search the communities which the content owner joined as a member, and can transmit information on the communities found by the search, together with the interface, to the content owner terminal 110.

For example, if the content owner is a member of SNS communities A, B, C, and D, and the content owner wishes to share travel photographs in community A, then the interface provider unit 121 can search for the communities of which the content owner is a member, and can transmit an interface to the content owner terminal 110, where the interface allows the input of the access threshold value for the travel photographs and of the weight values for communities A, B, C, and D.

The setting unit 122 can receive the selection information regarding the access threshold value and the community weight values selected via the interface from the content owner terminal 110, and can set the access threshold value and community weight values based on the values corresponding to the selections.

For example, if the access threshold value for travel photographs selected via the interface is "high", and the weight values for communities A, B, C, and D are "5", "2", "5", and "1", respectively, then the setting unit 122 can set the actual access threshold value and community weight values based on values corresponding to the selections. Of course, the values can be set in various ways in various different embodiments.

When a request for a particular content is received from the content requester terminal 130, the activity calculator unit 123 can search the communities in which the content requester is a member and extract common communities.

Here, the activity calculator unit 123 can search information regarding the acquaintances of the content requester.

Afterwards, for a common community, the activity calculator unit 123 can extract the number of visits by the content requester to the community, the number of replies made by the content requester in relation to posts made by the content owner in the community, and the number of one-to-one contacts (e.g. private messages, text messages, voice calls, etc.) between the content requester and the content owner within the community.

For this purpose, the activity calculator unit 123 can interwork with a mobile communication company server (not shown), and can request and receive one or more of the number of text messages and the number of voice calls between the content requester and the content owner from the mobile communication company server (not shown).

The activity calculator unit 123 can calculate the activity value of the content requester for a common community based on the extracted values described above. An example method for calculating the activity value can employ the following equation.

$$X = V + R + M$$

Here, "X" represents the activity value of the content requester for a particular community, "V" represents the number of visits made by the content requester to the community, "R" represents the number of replies made by the content requester in relation to posts made by the content owner in the community, and "M" represents the number of one-to-one contacts (e.g. private messages, text messages, voice calls, etc.) between the content requester and the content owner made within the community.

The reputation calculator unit 124 can calculate a reputation value for the content requester based on one or more of the number of common communities, and the weight values and activity values set for the common communities. An example method for calculating the reputation value can employ the following equation.

$$\text{user RePutation } RP = \frac{1}{n}\sum_{i=1}^{n} a_i X_i + a$$

Here, i represents an ordinal number for each community in cases where there are more than one common community, and n represents the total number of common communities. Also, $a_i$ represents the weight value set by the content owner for the i-th community, $X_i$ represents the activity value of the content requester for the i-th community, and a represents the number of acquaintances of the content owner who are also acquaintances of the content requester.

The reputation calculator unit 124 can make the calculations in consideration of various elements that represent the closeness of content requester with respect to the content owner.

The access authorization unit 125 can compare the reputation value calculated by the reputation calculator unit 124 with the access threshold value set by the setting unit 122, and if the content requester's reputation value is greater than the access threshold value of the particular content requested by the content requester, can provide the content requester with authorization to access the particular content.

If, however, the result of comparison between the reputation value and the access threshold value shows that the reputation value is smaller than the access threshold value, then the access authorization unit 125 can prevent the content requester from approaching the particular content. That is, the following may apply:

$$\text{Access if } RP > \delta, \text{ Reject else}$$

Here, RP represents the reputation value of the content requester, and δ represents the access threshold value which the content owner set for the content.

The content transmission unit 126 can transmit the content to the terminal 130 of the content requester if the content requester has been authorized access by the access authorization unit 125.

Figure 3:
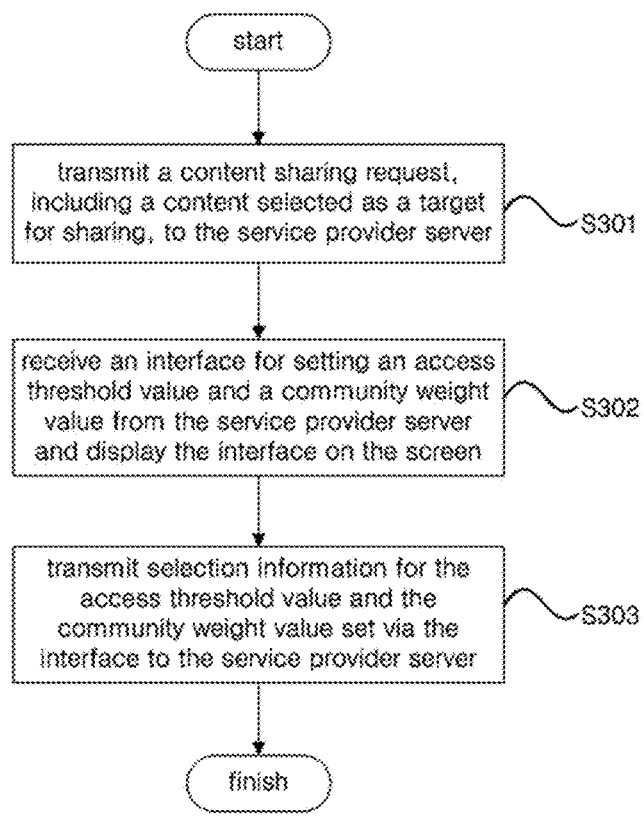
FIG. 3 is a flow diagram illustrating the procedures for providing a social network service according to an embodiment of the invention.

FIG. 3 is a flow diagram illustrating the procedures for providing a social network service according to an embodiment of the invention.

FIG. 3 illustrates the procedures by which a content owner shares a particular content via a SNS.

First, when a particular content chosen for sharing is selected by the content owner, the content owner terminal 110 may transmit a content sharing request, including information on the selected content, to the service provider server 120 (operation S301).

After operation S301, the content owner terminal 110 may receive an interface from the service provider server 120 for setting the access threshold value and the community weight values (operation S302).

The interface received in operation S302 can further include a section for inputting information regarding the content owner's acquaintances, in addition to sections for selecting the access threshold value and community weight values.

After operation S302, when the access threshold value and community weight values are set by the content owner via the interface, the content owner terminal 110 may transmit information on the corresponding selections to the service provider server 120 (operation S303).

In cases where information regarding the acquaintances of the content owner is inputted through the interface, the content owner terminal 110 can include the information on acquaintances in the transmitted information.

Figure 4A:
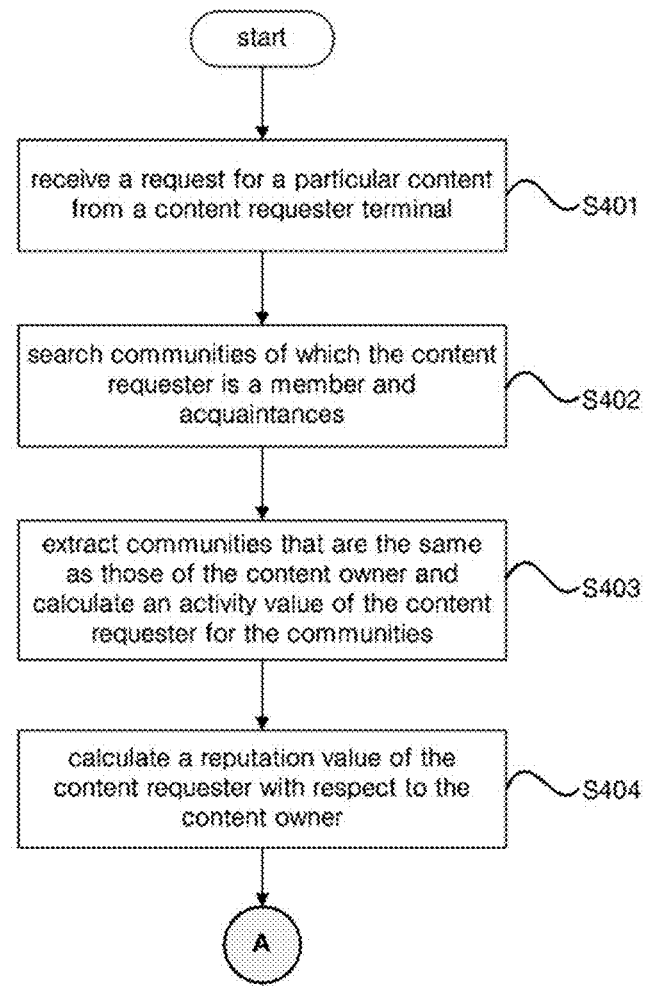
FIG. 4A and FIG. 4B are flow diagrams illustrating the procedures for providing a social network service according to another embodiment of the invention.
Figure 4B:
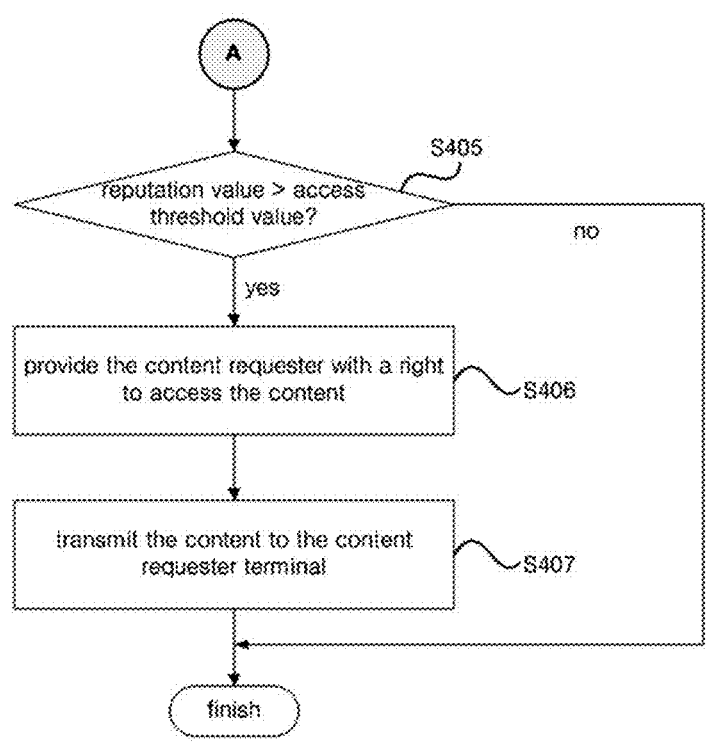

FIG. 4A and FIG. 4B are flow diagrams illustrating the procedures for providing a social network service according to another embodiment of the invention.

FIG. 4A and FIG. 4B illustrate procedures by which the service provider server 120 may receive a request for a particular content from a content requester, grant authorization, and provide the corresponding content.

First, the service provider server 120 may receive from the content requester terminal 130 a request for a particular content that was uploaded to a particular community (operation S401).

After operation S401, the service provider server 120 may search for communities that the content requester joined as a member and for the acquaintances of the content requester (operation S402).

After operation S402, the service provider server 120 may extract common communities and may calculate an activity value of the content requester for the extracted common communities, based on the number of visits by the content requester to the community, the number of replies made by the content requester in relation to posts made by the content owner in the community, and the number of one-to-one contacts (e.g. private messages, text messages, voice calls, etc.) between the content requester and the content owner within the community (operation S403).

If there are more than one common communities extracted, the service provider server 120 can calculate an activity value of the content requester for each common community.

After operation S403, the service provider server 120 may calculate a reputation value of the content requester with respect to the content owner, in consideration of the number of common communities, the weight values set for the common communities, the activity values set for the common communities, and the number of common acquaintances between the acquaintances of the content owner and the acquaintances of the content requester (operation S404).

After operation S404, the service provider server 120 may compare the reputation value calculated in operation S404 with the access threshold value set for the content requested by the content requester (operation S405), and may provide the content requester with authorization to access the requested content according to the result (operation S406).

After operation S406, the service provider server 120 may transmit the particular content to the content requester terminal 130 (operation S407).

Figure 5:
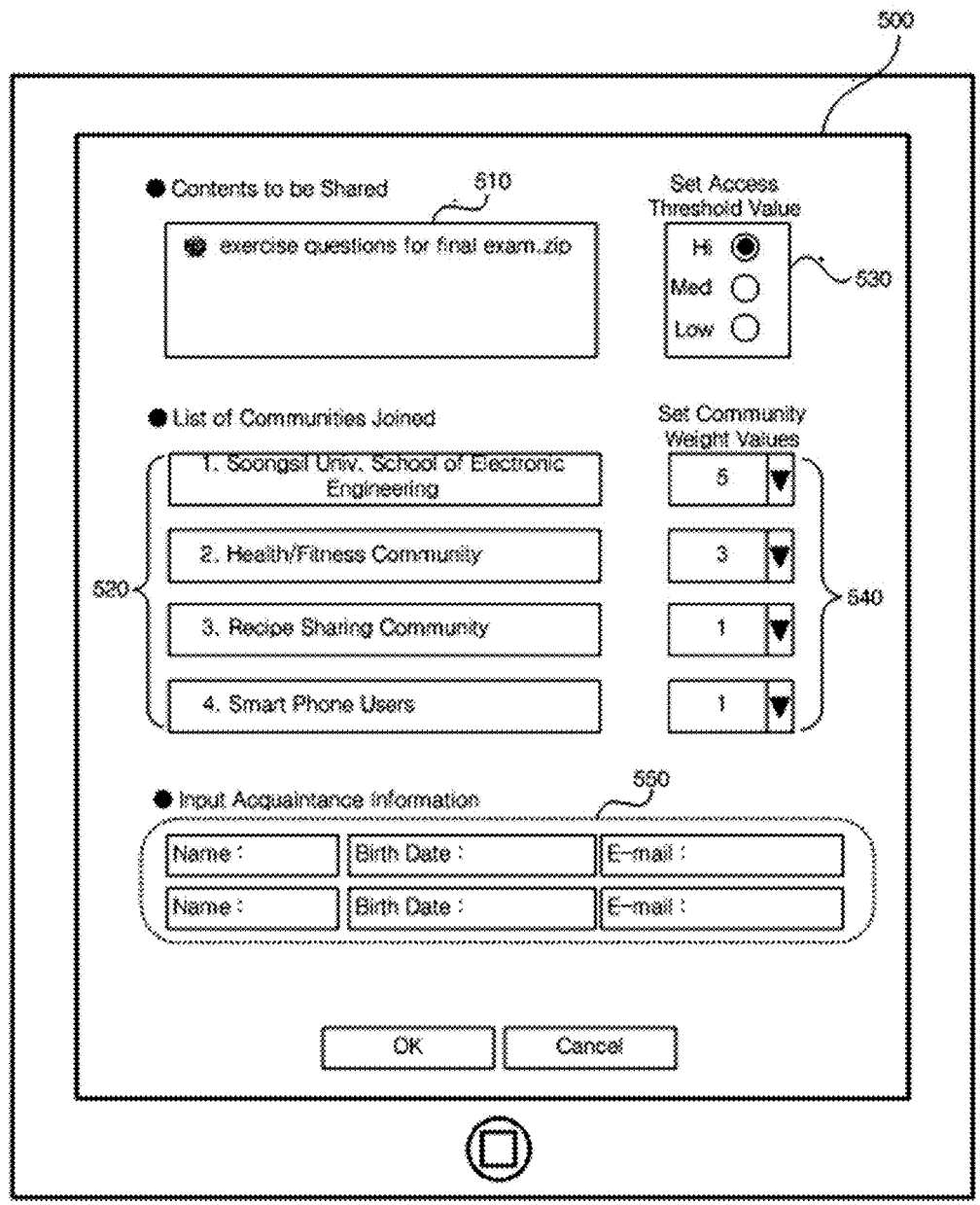
FIG. 5 illustrates an interface displayed on a content owner terminal according to an embodiment of the invention.

FIG. 5 illustrates an interface displayed on a content owner terminal 110 according to an embodiment of the invention.

When a particular content chosen for sharing is selected by the content owner, the content owner terminal 110 may transmit a content sharing request, which includes information on the selected content, to the service provider server 120 and may receive an interface 500 such as that shown in FIG. 5 from the service provider server 120 to display the interface on the screen.

The interface 500 in FIG. 5 displays the particular content 510 that the content owner wishes to share and a list 520 of communities of which the content owner is a member. Also displayed are buttons 530, 540 for setting the access threshold value for the content and the degree of importance of the communities.

A section 550 for inputting information on the content owner's acquaintances can also be included in the interface 500.

In a conventional service, the sharing of contents within a community may involve a community administrator determining membership ratings in consideration of the frequency of attendance in the community, the number of posts written, etc., and allowing the sharing of contents between community members only for those who have a particular membership rating or higher. According to an embodiment of the invention, however, the content owner can set an access threshold value, representing a sharing level for a content which the content owner wishes to share, and can set weight values according to the importance of the communities of which the content owner is a member, and the authorization of access to a particular content can be granted based on a user's reputation in consideration of the communication and relationship between the content owner and the content requester within a common community. This can not only provide a protection of privacy within a social network but can also enable a stable mode of content sharing within the social network.

The embodiments of the present invention set forth above are for illustrative purposes. It would be appreciated by those of ordinary skill in the field of art to which the present invention pertains that the embodiments above can be easily modified to other specific implementations without departing from the technical spirit of the present invention and without changing the essential features of the present invention.

Thus, the embodiments described above are merely given as examples and do not limit the present invention.

For example, a component described as an integrated form can be used in a distributed form, while components described as being in a distributed form can be used coupled together.

The scope of the present invention is to be defined by the scope of claims set forth below, and it is to be appreciated that all variations and modifications which can be derived from the meaning and scope of the claims as well as their equivalents are encompassed by the scope of the present invention.

What is claimed is:

1. A method for providing a social network service in a computer network including a hardware server, a terminal of a content owner, and a terminal of a content requester, the method comprising:
   (a) providing, by a processor of the hardware server, an interface to the terminal of the content owner through which the content owner sets an access threshold value for a particular content belonging to the content owner and a weight value for one or more communities of which the content owner is a member, wherein the interface provided to the terminal of the content owner is displayed on a screen of the terminal of the content owner and defines one or more first input fields configured to receive user input for setting the access threshold value for the particular content and one or more second input fields configured to receive user input for setting the weight value for the one or more communities of which the content owner is a member;
   (b) receiving, by the processor of the hardware server, the access threshold value for the particular content and the weight value for the one or more communities through the interface from the terminal of the content owner;
   (c) receiving, at the processor of the hardware server, a request for the particular content that is transmitted from the terminal the content requester;
   (d) extracting, by the processor of the hardware server, at least one common community from among the one or more communities of which both the content requester and the content owner are a member in response to the request for the particular content from the content requester, and calculating an activity value of the content requester for each of the at least one common community;

(e) calculating, by the processor of the hardware server, a reputation value for the content requester using i) a number of the at least one common community, ii) the weight value for each of the at least one common community, and iii) the activity value for each of the at least one common community;

(f) providing, by the processor of the hardware server, the content requester with authorization to access the particular content according to a comparison result between the calculated reputation value and the access threshold value for the particular content; and (g) transmitting, by the processor of the hardware server, the particular content to the terminal of the content requester after providing the content requester with authorization to access the particular content, wherein the activity value for a particular common community from among the at least one common community is calculated based on i) a number of visits by the content requester to the particular common community, ii) a number of replies by the content requester to posts written by the content owner in the particular common community, and iii) a number of one-to-one contacts between the content requester and the content owner within the particular common community, and the access threshold value indicates a permitted level of sharing the particular content according to the content owner, and the weight value indicates an importance of the one or more communities according to the content.

2. The method of claim 1, further comprising, before said step (a):
searching, by the processor of the hardware server, for the one or more communities of which the content owner is a member.

3. The method of claim 1, wherein said step (d) comprises:
receiving, by the processor of the hardware server, the request from a terminal of the content requester, the request including information on one or more communities of which the content requester is a member and information on an acquaintance of the content requester.

4. The method of claim 3, wherein said step (e) comprises calculating, by the processor of the hardware server, the reputation value based further on a number of acquaintances of the content requester that are also acquaintances of the content owner.

5. The method of claim 1, wherein said step (g) comprises transmitting, by the processor of the hardware server, the particular content to the terminal of the content requester if the calculated reputation value is greater than the set access threshold value.

6. An apparatus for providing a social network service in a computer network including a hardware server, a terminal of a content owner, and a terminal of a content requester, the apparatus comprising:
an interface provider unit embodied on the hardware server configured to provide an interface to the terminal of the content owner through which the content owner sets an access threshold value for a particular content belonging to the content owner and a weight value for one or more communities of which the content owner is a member, wherein the interface provided to the terminal of the content owner is displayed on a screen of the terminal of the content owner and defines one or more first input fields configured to receive user input for setting the access threshold value for the particular content and one or more second input fields configured to receive user input for setting the weight value for the one or more communities of which the content owner is a member;

a setting unit embodied on the hardware server configured to receive the access threshold value for the particular content and the weight value for the one or more communities through the interface from the terminal of the content owner and further configured to receive a request for the particular content that is transmitted from the terminal the content requester;

an activity calculator unit embodied on the hardware server configured to extract at least one common community from among the one or more communities of which both the content requester and the content owner are a member in response to the request for the particular content from the content requester, and calculate an activity value of the content requester for each of the at least one common community;

a reputation calculator unit embodied on the hardware server configured to calculate a reputation value for the content requester using i) a number of the at least one common community, ii) the weight value for each of the at least one common community, and iii) the activity value for each of the at least one common community;

an access authorization unit embodied on the hardware server configured to provide the content requester with authorization to access the particular content according to a comparison result between the calculated reputation value and the access threshold value for the particular content; and a content transmission unit embodied on the hardware server configured to transmit the particular content to the terminal of the content requester after providing the content requester with authorization to access the content, wherein the activity value for a particular common community from among the at least one common community is calculated based on i) a number of visits by the content requester to the particular common community, ii) a number of replies by the content requester to posts written by the content owner in the particular common community, and iii) a number of one-to-one contacts between the content requester and the content owner within the particular common community, and the access threshold value indicates a permitted level of sharing the particular content according to the content owner, and the weight value indicates an importance of the one or more communities according to the content.

7. The apparatus of claim 6,
wherein the setting unit searches for the one or more communities of which the content owner is a member.

8. The apparatus of claim 6, wherein the reputation calculator unit calculates the reputation value based further on a number of acquaintances of the content requester that are also acquaintances of the content owner.

9. The apparatus of claim 6, wherein the content transmission unit is further configured to transmit the particular content to the terminal of the content requester if the calculated reputation value is greater than the set threshold value.

10. The method of claim 1, further comprising:
searching, by the processor of the hardware server, for the one or more communities of which the content owner is a member;

providing, by the processor of the hardware server, each of the one or more communities through the interface to the terminal of the content owner; and receiving, by the processor of the hardware server, a weight value corresponding to each of the one or more communities through the interface from the terminal of the content owner.

11. The apparatus of claim 6, wherein:

the setting unit searches for the one or more communities of which the content owner is a member, the interface provider unit provides each of the one or more communities through the interface to the terminal of the content owner, and the setting unit receives a weight value corresponding to each of the one or more communities through the interface from the terminal of the content owner.

* * * * *